Patented Jan. 8, 1924.

1,479,955

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed April 30, 1921. Serial No. 465,928.

To all whom it may concern:

Be it known that I, STEWART J. CARROLL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates, but is not limited, to the ethers having that property. While the ethers form thin solutions in the lower monohydroxy aliphatic alcohols, or in the phenyl ethers and their homologues, it has been found that such single solvents by themselves do not dissolve a sufficient proportion of the ethers to make a desirably thick flowable composition or dope, such as may be used, for example, in the manufacture of photographic film base by customary methods or in other plastic arts requiring a strong solution. By lower monohydroxy aliphatic alcohols, I mean those containing less than six carbon atoms.

I have discovered, however, that an adequately strong and useful composition may be prepared by dissolving the ethers in a mixed solvent comprising such alcohols, phenyl ethers, and their homologues. I may, for example, combine methly alcohol, ethyl alcohol, propyl alcohol, isopropyl alcohol, butyl alcohol (normal, iso, or secondary) or fusel oil and the amyl alcohols, either singly or in various mixtures, with one or more of the phenyl ethers of which the following are typical:

Phenetole (phenyl-ethyl ether).
Anisole (phenyl-methyl ether).
Normal butyl o-cresyl ether.
Benzyl-ethyl ether.
Diphenyl ether.
Normal butyl-phenyl ether.
Normal butyl-benzyl ether.
Methyl o-cresyl ether.

The proportions may be greatly varied, but very useful ones are given merely by way of illustration in the following formulæ,—

From 90 to 50 parts of phenetol, anisole, or benzyl-ethyl ether may be mixed with from 10 to 50 parts by weight of methyl alcohol or ethyl alcohol.

Equal parts by weight of methyl alcohol and either normal butyl o-cresyl, diphenyl ether, normal butyl-phenyl ether, normal butyl-benzyl ether, or methyl o-cresyl ether, may be mixed to form preferred solvents, but, of course, the relative proportions can be varied.

I may greatly alter the amount of cellulose ether, for example water-insoluble ethyl cellulose, that is dissolved in these solvents. A thin solution is useful in varnish compositions, but for a thick, viscous, flowable solution I use a larger percentage of cellulose ether. I may, for instance, dissolve 1 part by weight of the ether in from 4 to 6 parts of one of the above mixed solvents and obtain a composition of value in the manufacture of film.

Other substances which impart additional suppleness or incombustibility, or other qualities, to the film may be added to the dope, such, for instance, as camphor, triphenyl phosphate, tricresyl phosphate, etc. Since the phenyl ethers and their homologues are of relatively low volatility, a considerable amount of them can remain in the film and impart useful properties thereto. The replacing of an atom of hydrogen on the benzene ring of any of these ethers with a chlorine atom does not in general impair its usefulness in the above compositions.

The ingredients are of the ordinary commercial type and sufficiently purified for the process of film manufacture, so as to give a dope yielding films having the proper relative freedom from color. The viscous-flowable dopes above described can be used in connection with the usual film-forming apparatus without the necessity of expensive alterations in the latter.

Since the ratio of the weight of phenyl ether to the weight of the cellulose ether can be made much greater by the use of my mixed solvent, instead of using phenyl ether alone as a solvent, it follows that a correspondingly greater proportion of phenyl ether will be present in the finished film than when the cellulose ethers are dissolved in the phenyl ethers alone.

Having thus described my invention, what I claim as new and desire to secure by Letters Patent is:

1. A viscous, flowable composition, comprising a solution of an alkyl ether of cellulose in a mixture containing a lower monohydroxy aliphatic alcohol and one of the group of a phenyl ether and its homologues.

2. A viscous, flowable composition, comprising a solution of an alkyl ether of cellulose in a mixed solvent containing from 90 to 50 parts by weight one of the group of a phenyl ether and its homologues, and from 10 to 50 parts of a lower monohydroxy aliphatic alcohol.

3. A viscous, flowable composition, comprising a solution of an alkyl ether of cellulose in a solvent containing phenetole and a lower monohydroxy aliphatic alcohol.

4. A composition of matter, comprising water-insoluble ethyl cellulose dissolved in phenetole and methyl alcohol.

5. A composition of matter, comprising 1 part by weight of water-insoluble ethyl cellulose dissolved in approximately from 4 to 6 parts by weight of a mixed solvent containing phenetole and a lower monohydroxy aliphatic alcohol.

6. As an article of manufacture, a deposited, transparent flexible film comprising a cellulose ether and one of the group of a phenyl ether and its homologues, the proportion of said phenyl ether in said film being greater than the maximum proportion depositable in a transparent film from a solution of said cellulose ether in said phenyl ether alone.

7. A composition of matter comprising cellulose ether and phenetole.

Signed at Rochester, New York, this 21st day of April, 1921.

STEWART J. CARROLL.